United States Patent Office 3,275,125
Patented Sept. 27, 1966

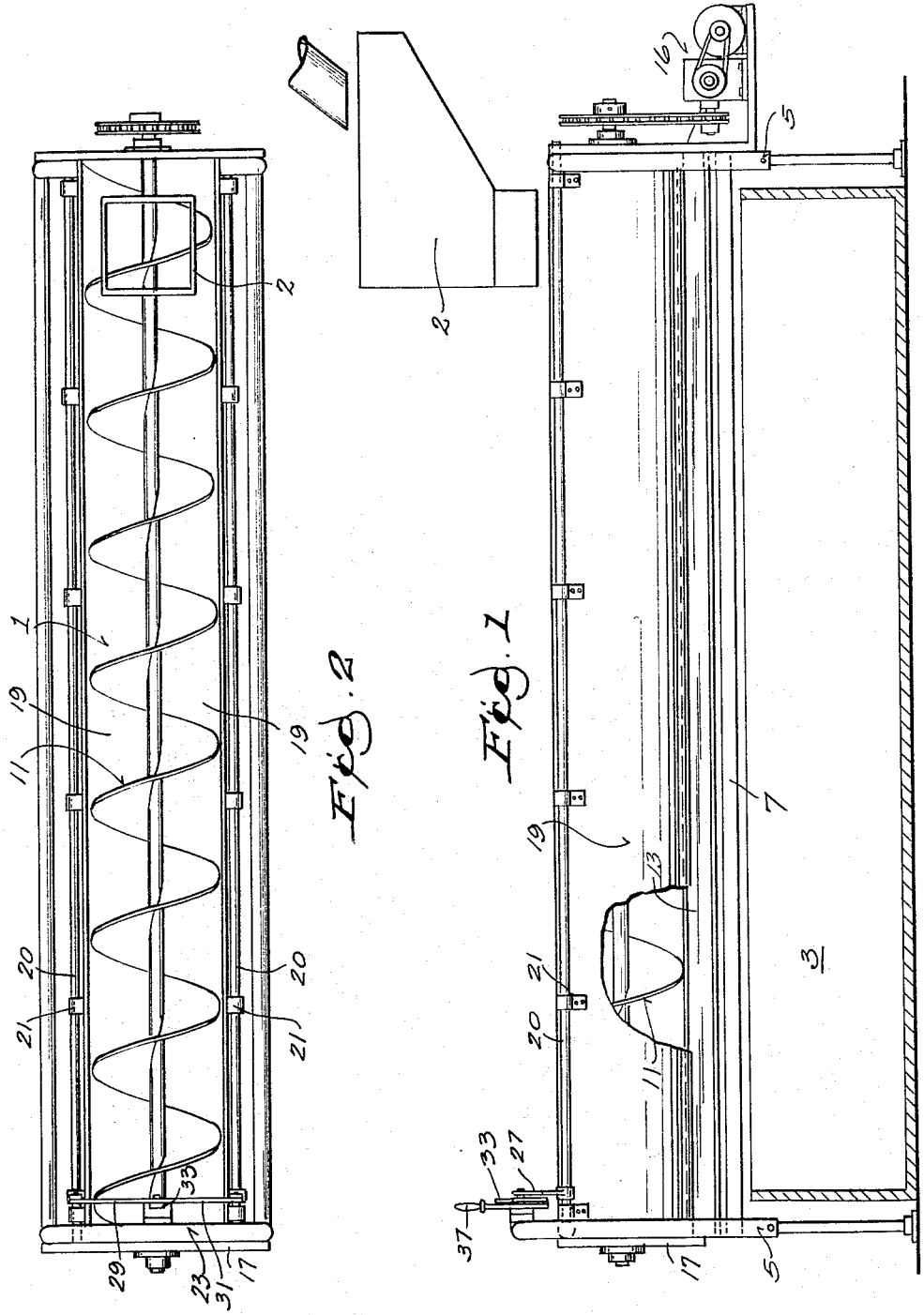

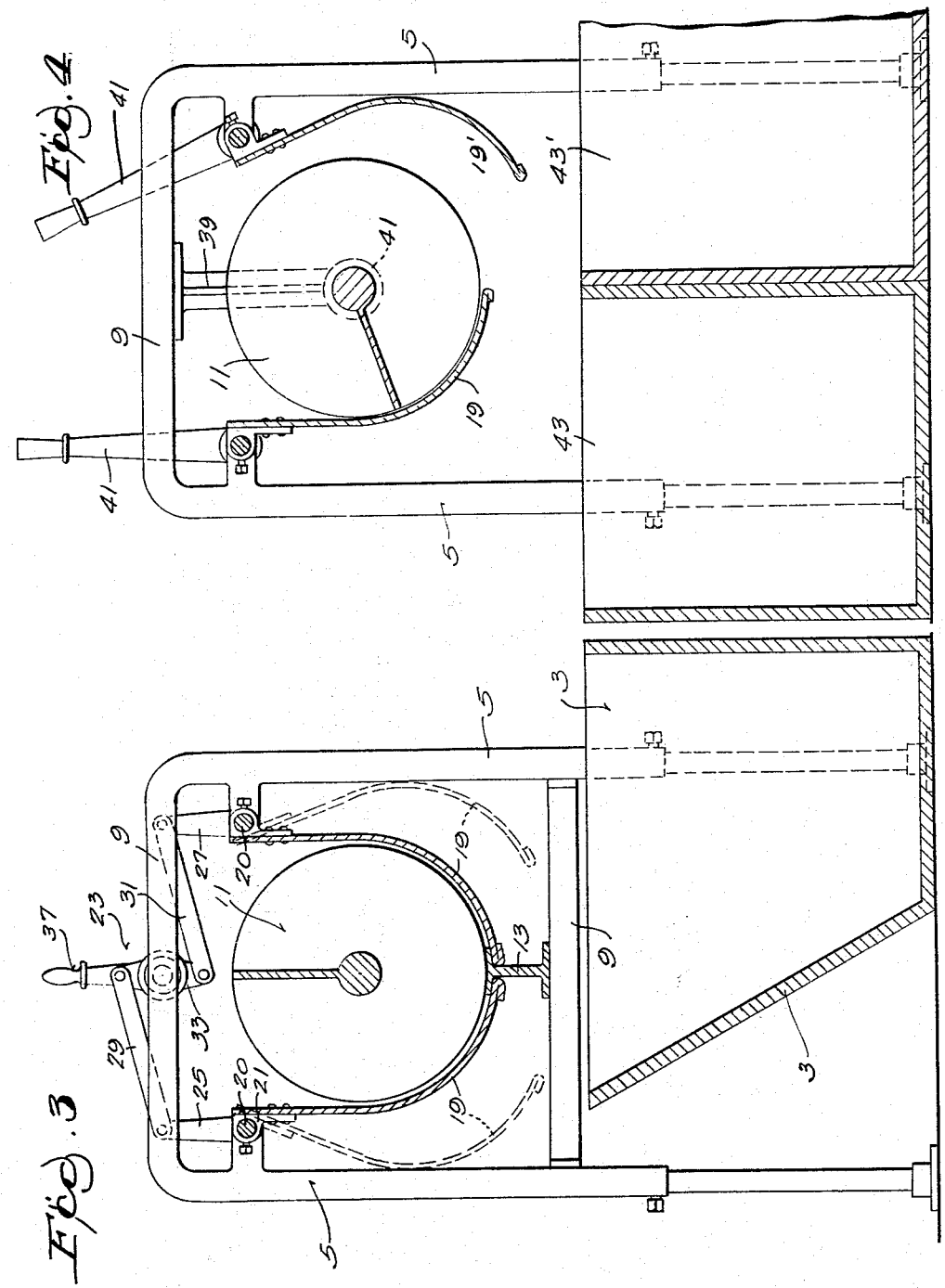

3,275,125
AUGER FEEDER
George D. Prentice, Milwaukee, Wis., assignor to A. F. Klinzing Co., Inc., Milwaukee, Wis., a corporation of Wisconsin
Filed Dec. 21, 1964, Ser. No. 419,879
4 Claims. (Cl. 198—205)

This invention relates to improved auger feeders such as are commonly employed to distribute feed to elongated bunkers for simultaneous consumption by a large number of animals.

Prior art feeders have often been less than satisfactory in that they failed to fill the bunkers equally along their length. Unequal filling of the bunkers tend to cause the animals to crowd toward the filled portions of the feeder. This crowding often results in only the more physically fit or stronger animals receiving sufficient food. The problem is accentuated by the fact that, in common practice, the feeder is loaded at one end from a silo or other bulk storage structure and transported therefrom down the length of the bunkers. Unless special precautions are taken during the operation of the feeder, the end of the bunker nearest the bulk storage structure becomes filled to a greater extent than the portions further away resulting in crowding of the animals near the bulk storage structure.

It is therefore, a primary object of this invention to provide an auger type feeder which is capable of simultaneously discharging equal amounts of feed from the auger feeder into adjacent feeding bunkers.

Another object of this invention is to provide an improved auger feeder which is especially adapted for use with silos or other bulk storage means for distributing the feed therefrom to feeding bunkers.

Yet another object of this invention is to provide an auger feeder which is rugged in construction and simple in operation and maintenance, thereby rendering possible substantially trouble free operation over substantial periods of time.

These and other object of this invention are obtained by providing an auger type feeder having an elongated frame forming a support means therefor. The auger screw is rotatably mounted inside the frame. A pair of doors are pivotally mounted on the frame on either side of the auger screw. The lower portions of the pair of doors are curved to the circumference of the auger screw so as to form a trough for the animal feed when closed. A means is provided to pivot open the pair of doors when the feed is properly distributed in the feeder to allow it to drop into the feeding bunkers.

The invention, both as to its construction and method of operation, will be better understood from the following specifications and drawings, forming a part thereof, in which:

FIGURE 1 is a side view of one embodiment of the auger feeder of this invention;

FIGURE 2 is a top view of the auger feeder shown in FIGURE 1;

FIGURE 3 is an end view of the auger feeder;

FIGURE 4 is another embodiment of the auger feeder of this invention.

Referring now to the figures, there is shown therein an auger feeder 1 suitable for distributing feed stored in hopper 2 to bunkers 3. It will be appreciated that this feeder may be of any length, as determined by the number of animals to be fed. The feeder is supported by a frame consisting of a plurality of pairs of adjustable upright members 5 positioning the feeder the desired height above the ground and a plurality of longitudinally strengthening members 7 and lateral strengthening members 9. The auger screw 11 lies within the frame thus created and rests on rail 13 mounted on strengthening member 9 and running the length of the feeder. Auger screw 11 is rotated in a direction to transport feed placed in hopper 2 to the outer end of the feeder by power source 16. A plate 17 prevents the feed from spilling out the end of the feeder.

A pair of inwardly curver or hook shaped doors 19 are fixedly mounted on rods 20 by brackets 21. Rods 20 are mounted on upright members 5. The lower curved portions of these doors closely conform to the circumference of the auger screw 11 while the ends of the doors abut rail 13. Doors 19 thus form a feed trough around auger screw 11. An opening mechanism 23 is provided to swing the curved doors 19 away from auger screw 11 to deposit the feed in bunkers 3 below. Toggle members 25 and 27 are mounted on rods 20 to swing the doors 19 away from auger screw 11 when toggle members 25 and 27 are pivoted toward the center of the feeder. Levers 29 and 31 are connected to toggle members 25 and 27 respectively, and to pivot bar 33 mounted on lateral strengthening member 9. A handle 37 is provided to pivot bar 33.

To operate the auger feeder, hopper 2 may be filled with feed from a silo. Auger screw 11 is rotated by power source 16 to move the feed from hopper 2 along the trough created by the inwardly curved doors 19. When a sufficient amount of feed is properly distributed in the feeder, auger screw 11 may be stopped or rotation thereof may be continued if desired. Handle 37 is then operated to cause levers 29 and 31 to move toggle levers 25 and 27 toward the center of the feeder. In the view shown in FIGURE 3, handle 37 would be moved to the right. This causes the doors 19 to move away from auger screw 11, opening the trough and allowing the feed to be dispersed and to fall into bunkers 3.

FIGURE 4 shows an alternative embodiment of the invention wherein auger screw 11 is supported by bearing hangers 39 containing bearings 41. In this case, the curved doors 19, 19' abut each other directly to form a feed trough about auger 11. Bearing hangers 39 are in turn shown mounted on horizontal supporting members 9. Opening mechanism 23 may either be supported by hanger 39 for simultaneous operation of the curved doors through the expedient of toggle links and levers as in the device of FIG. 3, or the curved doors 19, 19' may be independently operated as by the separate levers 41 connected directly thereto. Such independent operation of the curved doors is especially desirable and advantageous in cases wherein the food is to be dispersed to oppositely facing bunkers 43, 43' located on opposite sides of the longitudinal centerline. In such modfied feeder, the food to be dispersed is delivered to one or the other end of the auger as by means of hoppers located at opposite ends thereof, and the food may be selectively fed to one side, or the other, by opening the desired door to the required extent. Means should, of course, also be provided for rotating the auger in opposite directions since most effective operation and discharge from one side or the other depends upon proper auger rotation. For example, with the door 19' open as in FIG. 4 to discharge into the bunker 43', the direction of auger rotation should properly be counter-clockwise, and if the discharge is to be in bunker 43, the door 19' should be closed and door 19 opened with the direction of auger rotation being clockwise as viewed in FIG. 4.

From the foregoing it will be appreciated that there has been provided an improved auger type livestock feeder which insures equal distribution of feed throughout elongated bunkers by first properly distributing the feed in a trough formed by a pair of inwardly curved doors adjacent the auger screw. These doors are swingably suspended at opposite sides of the auger, and means are provided for either simultaneously swinging the same away from each other to provide an opening of desired width along the length of the feeder or for independently swinging the same to deliver to one side or the other. Thus the feed conveyed by the auger is evenly distributed in desired amounts throughout the length of the bunker. While manual operation has been shown and described, power operation may be provided if desired. Also, in the device of FIG. 3, the use of the I-beam or rail below the auger present the further advantage of taking the wear from the trough and/or the end bearings, and it should be understood that the modified device of FIG. 4 providing for independent operation of the doors may also incorporate the rail 13 to advantage.

Various modes of carrying out the invention are contemplated as being within the scope of the following claims particularly pointing out and distinctly claiming the subject matter which is regarded as the invention.

What I claim is:

1. An elongated auger type feeder comprising:
   a frame;
   a centrally located rail extending the length of the frame;
   an auger screw rotatably mounted in said frame and resting on said rail;
   a pair of curved doors pivotally mounted on said frame on opposite sides of the auger screw to enclose the lower portion of the auger screw and to abut said rail when closed; and
   means to pivotally open said doors to disperse feed along the length of the feeder.

2. An auger feeder according to claim 1, wherein the means to pivotally open the doors includes a single lever pivotally mounted on the frame and connected with the doors to simultaneously swing the same to open position.

3. An auger feeder according to claim 1, wherein the means to pivotally open the doors includes a lever for each of the doors for independently swinging the same to open position.

4. An elongated auger type feeder comprising:
   a frame having a plurality of upright, longitudinal, and lateral members supporting said feeder;
   a centrally located rail mounted on said lateral members and extending the length of the feeder;
   an auger screw rotatably mounted in said frame and resting on said rail;
   a pair of rods rotatably mounted on said frame on either side of the auger screw;
   a pair of inwardly curved doors fixedly mounted on said rods on opposite sides of the auger screw to enclose the lower portion of the auger screw and to abut said rail when closed; and
   means mounted on said frame to rotate said rods to open and close said doors along the length of said feeder.

References Cited by the Examiner

UNITED STATES PATENTS

| | | | |
|---|---|---|---|
| 174,617 | 4/1876 | Caldwell | 198—213 |
| 2,911,802 | 11/1959 | Holland. | |
| 3,132,738 | 5/1964 | Engseth | 198—184 |

EVON C. BLUNK, *Primary Examiner.*

R. J. HICKEY, *Assistant Examiner.*